United States Patent
Fujimori (10) Patent No.: US 6,697,722 B2
(45) Date of Patent: Feb. 24, 2004

(54) STEERING APPARATUS IN VEHICLE AND INDUSTRIAL VEHICLE

(75) Inventor: Hiroyuki Fujimori, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 5 days.

(21) Appl. No.: 10/206,605

(22) Filed: Jul. 26, 2002

(65) Prior Publication Data

US 2003/0023358 A1 Jan. 30, 2003

(30) Foreign Application Priority Data

Jul. 27, 2001 (JP) ...................................... 2001-227683

(51) Int. Cl.[7] ............................................... B62D 5/04
(52) U.S. Cl. ............................. 701/41; 701/50; 180/443
(58) Field of Search ............................. 701/50, 41, 42, 701/43; 180/443, 445, 446

(56) References Cited

U.S. PATENT DOCUMENTS

| | | | | |
|---|---|---|---|---|
| 4,703,819 A | * | 11/1987 | Hosotani | 180/403 |
| 4,792,008 A | * | 12/1988 | Hosotani | 180/422 |
| 5,086,859 A | * | 2/1992 | Takahashi et al. | 180/446 |
| 5,542,490 A | | 8/1996 | Kemshall et al. | 180/422 |
| 2003/0028306 A1 | * | 2/2003 | Fujimori | 701/41 |

FOREIGN PATENT DOCUMENTS

| | | |
|---|---|---|
| EP | 0926042 A1 * | 6/1999 |
| JP | 07-206399 | 8/1995 |
| JP | 10-157637 | 6/1998 |
| JP | 11-115790 | 4/1999 |
| JP | 2000-351379 | 12/2000 |

\* cited by examiner

*Primary Examiner*—Gary Chin
(74) *Attorney, Agent, or Firm*—Morgan & Finnegan, LLP

(57) ABSTRACT

A steering apparatus has a manipulator, a steered wheel being steered in a steered range, which is between two predetermined end positions. A first detector detects operation of the manipulator and outputs a signal representing the detection result. A second detector detects at least one of two states of the steered wheel and outputs a signal representing the detection result. In one of the states, the steered wheel is at either of the end positions. In the other state, the steered wheel is deviated from either of the end positions. A controller controls a driving device. The controller causes the driving device to steer the steered wheel in accordance with the signal from the first detector. When the steered wheel reaches either one of the end positions, the controller causes the driving device to stop steering motion of the steered wheel based on the signal from the second detector and to hold the steered wheel at the end position.

17 Claims, 4 Drawing Sheets

STEERING APPARATUS IN VEHICLE AND INDUSTRIAL VEHICLE

BACKGROUND OF THE INVENTION

The present invention relates to a steering apparatus for a vehicle and to an industrial vehicle.

A full-electric steering apparatus is disclosed in Japanese Laid-Open Patent Publication No. Hei 7-206399, as a kind of steering apparatus in a vehicle such as an industrial vehicle. An order picking truck in this application comprises a controller. The controller inputs the rotation angle of a steering wheel from a potentiometer, and inputs a steered angle of a steered wheel from another potentiometer. The controller calculates deviation of voltages detected by both potentiometers, and outputs a driving voltage that corresponds to the deviation to a steering motor. The steered wheel is turned by the driving force of the steering motor to by an angle that corresponds to the rotated angle of the steering wheel. Since the steering wheel is not mechanically coupled to the steered wheel, the steering wheel can be rotated even if the steered wheel reaches a limit of steering.

The known steering apparatuses include a full-hydraulic power steering apparatus that turns the steered wheel by supplying a steering cylinder with oil the amount of which corresponds to the amount of steering wheel operation.

Figure 6A:
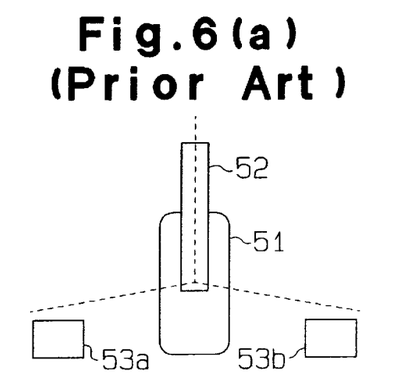
FIG. 6(a) is a schematic plan view of a prior art stopper and stopper blocks.
Figure 6B:
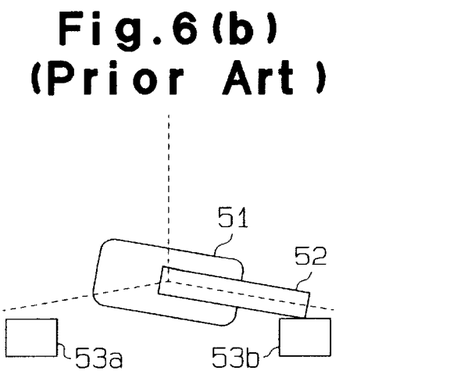
FIG. 6(b) is a schematic plan view showing the state where the stopper contacts one of the stopper blocks.

FIG. 6(a) shows such a steering apparatus, which is provided with a stopper 52 for a supporting member supporting a steered wheel 51. The apparatus of FIG. 6(a) also has stopper blocks 53a and 53b in positions that correspond to steering limits (end positions) of a left turn and a right turn of the steered wheel 51. As shown in FIG. 6(b), when the stopper 52 contacts the stopper block 53b, the steered wheel 51 is stopped at the end position of the right turn. When the stopper 52 contacts the stopper block 53a, the steered wheel 51 is stopped at the end position of the left turn.

However, in the steering apparatus shown in FIG. 6(a), when the stopper 52 contacts the stopper block 53a or the stopper block 53b, an impact is made on, for example, a gear part that conveys the driving force of the steering motor to the steered wheel 51. The gear part also receives the driving force of the steering motor. This may break the gear part. It is therefore necessary to process the gear part to make it stronger against impacts, which requires much labor in manufacturing the gear parts. Further, impacts on the gear part generate unpleasant noise.

In a power steering apparatus disclosed in Japanese Laid-Open Patent Publication No. Hei 10-157637, turning motion of the steered wheel 51 is decelerated as the steered wheel 51 approaches any of the steering limits. This reduces impacts made when the stopper 52 contacts the stopper blocks 53a and 53b.

However, although impacts and the load of the steering motor are somewhat reduced, the stopper 52 contacts the stopper blocks 53a, 53b. The gear part therefore still receives the impacts and the load. Since the turning speed of the steered wheel 51 is decelerated near the steering limits, the responsiveness of the steered wheel 51 to the steering wheel operation is lowered near the steering limits.

SUMMARY OF THE INVENTION

It is a first objective of the present invention to provide a steering apparatus and an industrial vehicle that stop turning motion of a steered wheel at end positions without causing the stopper of the steered wheel to contact stopper blocks, and are capable of holding the steered wheel at the end positions.

It is a second objective of the present invention to provide a steering apparatus and an industrial vehicle that improve responsiveness of the steered wheel to operation of a steering wheel without reducing the turning speed of the steered wheel near the ends.

To achieve the foregoing objective, the present invention provides a steering apparatus for a vehicle. The steering apparatus includes a manipulator, a steered wheel, a first detector, a driving device, a second detector and a controller. The steered wheel is steered in a steered range, which is between two predetermined end positions. The first detector detects operation of the manipulator and outputs a signal representing the detection result. The driving device generates a driving force to steer the steered wheel. The second detector detects at least one of two states of the steered wheel and outputs a signal representing the detection result. In one of the states, the steered wheel is at either of the end positions. In the other state, the steered wheel is deviated from either of the end positions. The controller controls the driving device. The controller causes the driving device to steer the steered wheel in accordance with the signal from the first detector. When the steered wheel reaches either one of the end positions, the controller causes the driving device to stop steering motion of the steered wheel based on the signal from the second detector and to hold the steered wheel at the end position.

The present invention also provides a forklift having a steering apparatus. The steering apparatus includes a manipulator, a steered wheel, a first detector, a driving device, a second detector and a controller. The steered wheel is steered in a steered range, which is between two predetermined end positions. The first detector detects operation of the manipulator and outputs a signal representing the detection result. The driving device generates a driving force to steer the steered wheel. The second detector detects at least one of two states of the steered wheel and outputs a signal representing the detection result. In one of the states, the steered wheel is at either of the end positions. In the other state, the steered wheel is deviated from either of the end positions. The controller controls the driving device. The controller causes the driving device to steer the steered wheel in accordance with the signal from the first detector. When the steered wheel reaches either one of the end positions, the controller causes the driving device to stop steering motion of the steered wheel based on the signal from the second detector and to hold the steered wheel at the end position.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE EMBODIMENT

One embodiment of the invention will hereinafter be described with reference to FIG. 1 to FIG. 5.

Figure 3:
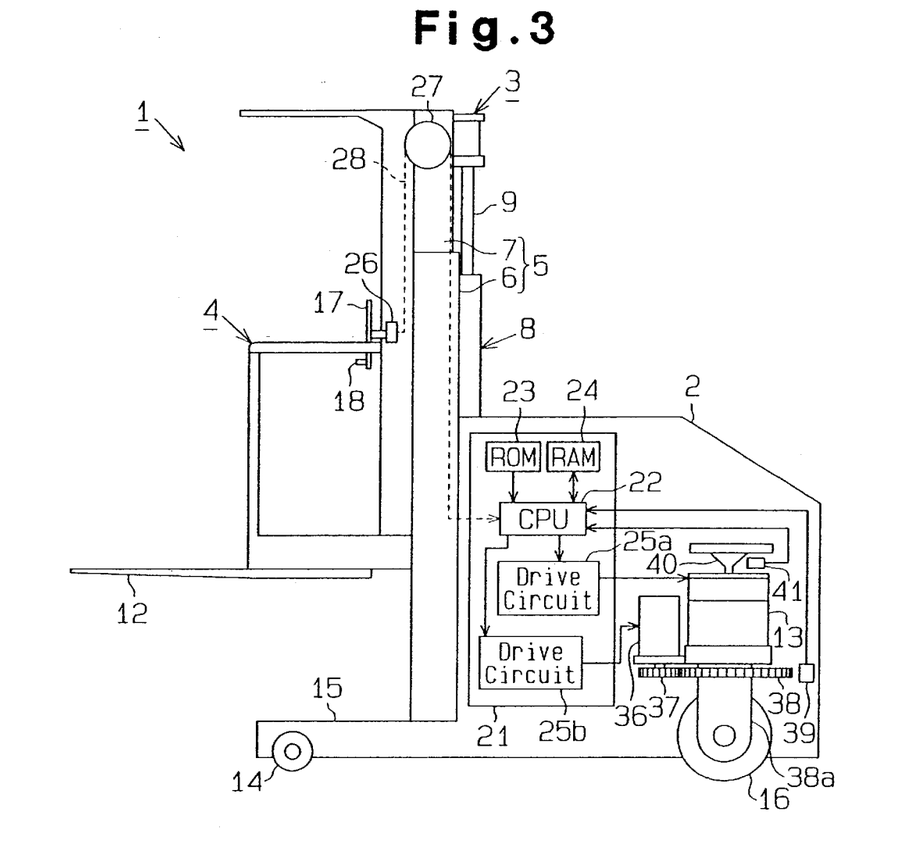
FIG. 3 is a schematic side view of a forklift of an order picking type.
Figure 5:
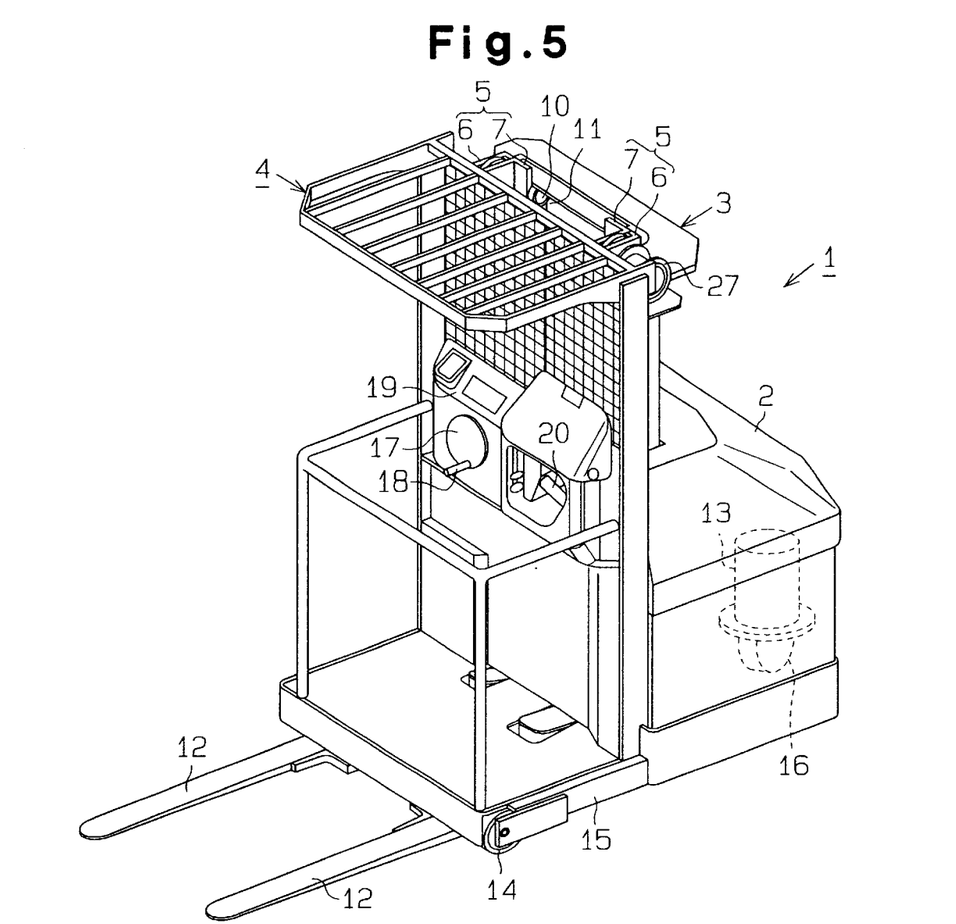
FIG. 5 is a schematic perspective view of the forklift of the order picking type.

FIG. 3 is a schematic side view of an industrial vehicle, which is a forklift 1 of an order picking type in this embodiment. FIG. 5 is a schematic perspective view of the same.

As shown in FIG. 3 and FIG. 5, the forklift 1 is equipped with a mast device 3 standing in a front part of a body 2. The forklift 1 has a front platform 4. The front platform 4 is lifted and lowered along a mast assembly 5, which constitutes the mast device 3. The mast assembly 5 comprises an outer mast 6 and an inner mast 7. The distal end of a piston rod 9 of a lift cylinder 8 (shown in FIG. 3) is fixed to an upper end portion of the inner mast 7. When the lift cylinder 8 is actuated, the inner mast 7 slides through the outer mast 6 so that the mast assembly 5 extends and contracts.

A sprocket 10 (refer to FIG. 5) is mounted in the upper portion of the inner mast 7. The front platform 4 is suspended by a chain 11 (refer to FIG. 5), which is hooked around the sprocket 10. When the lift cylinder 8 is actuated to extend and contract the inner mast 7 through the outer mast 6, the front platform 4 is lifted and lowered relative to the body 2. A pair of forks 12 are attached to the bottom of the front platform 4. The vertical position of the forks 12 is determined according to the vertical position of the front platform 4.

The forklift 1 is a battery vehicle having two coasting front wheels 14 (only one side is shown) and one driven and steered rear wheel 16. The driving source of the forklift 1 is a driving motor 13 loaded on the body 2. The front wheels 14 are placed in front edge portions of a pair of right and left legs 15, which extend forward from the right and left sides of the body 2. A driven steered wheel (hereinafter simply referred to as steered wheel) 16 is disposed substantially in the center position in the width of the rear part of the body 2.

The front platform 4 is equipped with a steering wheel 17. Operation of the steering wheel 17 steers the steered wheel 16 to change the moving direction of the forklift 1. A knob 18 extends from a predetermined position of the steering wheel 17. The steering wheel 17 can be rotated with the knob 18 with no maximum turning limits in either right or left directions. Further, as shown in FIG. 5, besides the steering wheel 17, an instrument panel 19, an operation lever 20, and switches of various kinds (not shown) are disposed on the front platform 4.

As shown in FIG. 3, the forklift 1 comprises a controller 21 as a control means. A CPU 22, a ROM 23, and a RAM 24 are built in the controller 21. The ROM 23 stores various kinds of control programs. The RAM 24 temporarily stores calculation results of the CPU 22. The CPU 22 executes the control programs stored in the ROM 23. Further, the controller 21 comprises a motor drive circuit 25a connected to the driving motor 13 and a motor drive circuit 25b connected to a power steering motor 36, which is discussed below.

The steering wheel 17 is equipped with a steering angle sensor 26 as means for detecting the steering wheel operation. The steering angle sensor 26 is connected to an input terminal of the controller 21 via a signal line 28 that is wound about a pulley 27. The steering angle sensor 26 is constituted of, for example, a rotary encoder.

The forklift 1 comprises the power steering motor (hereinafter simply referred to as a PS motor) 36 as an electromotor mounted on the body 2. A gear 37 fixed to an output axis of the PS motor 36 is engaged with a gear wheel 38 that supports the steered wheel 16. When the PS motor 36 is driven, the driving force of the driven PS motor 36 is conveyed from the gear 37 to the gear wheel 38, which steers the steered wheel 16 in a direction that corresponds to the rotation direction of the PS motor 36.

A tire angle sensor 39 is placed in a position to face the gear wheel 38. The tire angle sensor 39 is connected to the input terminal of the controller 21. The tire angle sensor 39 is constituted of, for example, a potentiometer, and outputs a detection signal (voltage value) that corresponds to a steered angle of the steered wheel 16 to the CPU 22. The CPU 22 calculates a steering angle (tire angle) of the steered wheel 16 on the basis of the detection signal from the tire angle sensor 39.

A steering apparatus in the forklift 1 is constituted of the steered wheel 16, the steering wheel 17, the controller 21, the steering angle sensor 26, the PS motor 36, and the tire angle sensor 39. This steering apparatus is a full-electric steering apparatus in which the PS motor 36 is electrically controlled on the basis of a detection value from the steering angle sensor 26 to steer the steered wheel 16.

On an upper part of the driving motor 13, a vehicle speed sensor 41 for detecting rotation of a driving axis 40 of the driving motor 13 is placed. The speed sensor 41 outputs a detection signal (pulse signal) that corresponds to the rotation of the driving axis 40 of the driving motor 13 to the CPU 22. On the basis of the detection signal, the CPU 22 calculates the speed of the forklift 1.

On the basis of the position of the steered wheel at the time when the steering wheel operation is stopped or stopped for a moment to change the steering direction, the CPU 22 designates "−" when the steering wheel 17 is steered to the left, and "+" when the steering wheel 17 is steered to the right, for example. According to the detection signal from the steering angle sensor 26, the CPU 22 calculates the steering wheel angle (operation angle) of the steering wheel 17. Further, on the basis of the state of the steered wheel 16 in the state of moving straight, the CPU 22 designates "+" when the steered wheel 16 is turned in a right direction in response to the right steering of the steering wheel 17, and "−" when the steered wheel 16 is turned in a left direction. According to the detection signal from the tire angle sensor 39, the CPU 22 calculates the tire angle $\theta$ of the steered wheel 16. The CPU 22 further calculates a steering wheel angle conversion value by converting the tire angle $\theta$ into a steering wheel angle equivalence.

Next, the CPU 22 calculates an angle difference between the steering wheel 17 and the steered wheel 16 based on the difference between the steering wheel angle and the steering wheel angle conversion value. The CPU 22 then outputs an output command value based on the angle difference to the motor drive circuit 25b. The motor drive circuit 25b outputs a current value, which corresponds to the output command value from the CPU 22, to the PS motor 36. The PS motor 36 outputs the driving force that corresponds to the current value. As a result, the steered wheel 16 rotates in accordance with the operation of the steering wheel 17. The PS motor 36 may be applied to voltage control. The PS motor 36 may be controlled according to the output command value that corresponds to a steering wheel steering speed.

According to the above procedure, although the steered wheel 16 is not mechanically coupled to the steering wheel 17, the steered wheel 16 is steered in accordance with the operation of the steering wheel 17. These steering control programs are stored in the ROM 23.

Figure 4A:
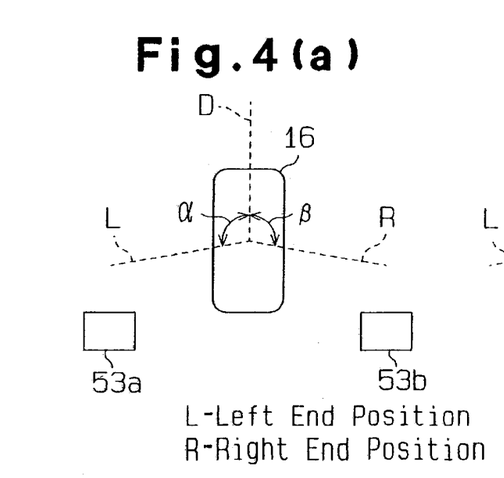
FIG. 4(a) is a schematic plan view of the steered wheel in a state of moving straight.

FIG. 4(a) is a schematic plan view of the steered wheel in the state of moving straight.

As shown in FIG. 4(a), an end position L is set in a position where the steered wheel 16 is turned to the left from a straight direction D at an end angle α. Similarly, an end position R is set in a position where the steered wheel 16 is turned to the right from the straight direction D at an end angle β. Values of the end angles α, β are numerical data stored in the ROM 23, and set depending on the types of vehicle. In this embodiment, the end angle α and the end angle β are set to be equal.

The steered wheel 16 is supported by a supporting member (gear box) 38a (see FIG. 3). The supporting member 38a has a stopper (not shown) similar to one shown in FIGS. 6A and 6B. In the corresponding parts of the body 2, stopper blocks 53a and 53b (shown in FIG. 4(a)) are provided. The stopper of the supporting member 38a contacts either of the stopper blocks 53a, 53b when the steered wheel 16 is turned beyond the left end position L or the right end position R by a predetermined angle.

Next, steering control processing executed by the CPU 22 will be described with reference to flowcharts in FIG. 1 and FIG. 2. Program data shown in these flowcharts are part of the steering control and stored in the ROM 23.

Figure 1:
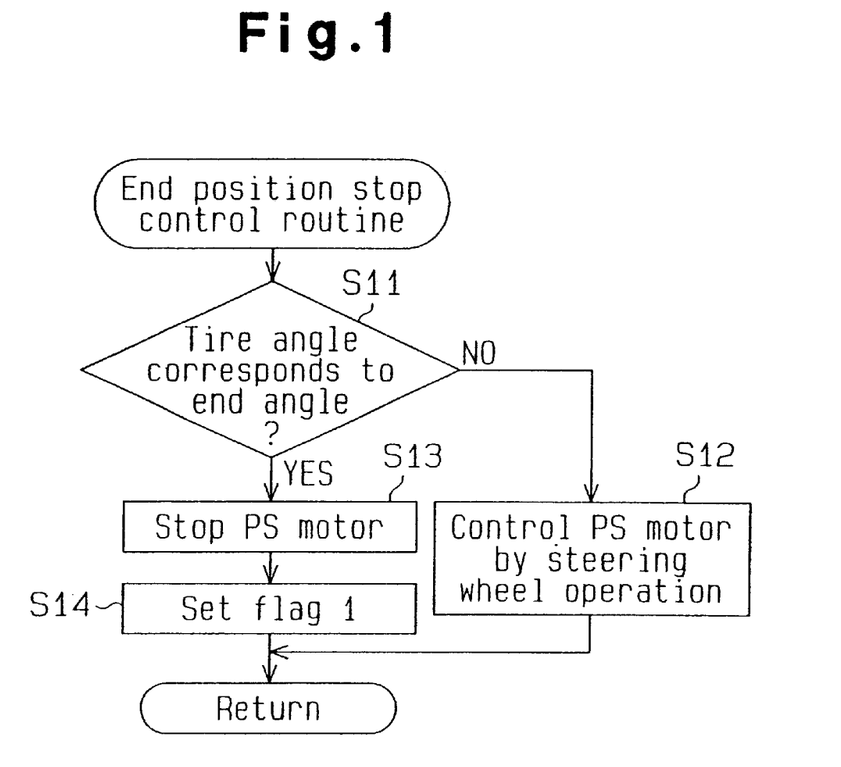
FIG. 1 is a flowchart of a stop control for stopping turning motion of a steered wheel at an end position.

An end position stop control routine shown in FIG. 1 is executed when the PS motor 36 is driven according to the operation of the steering wheel 17. A hold control routine shown in FIG. 2 is executed when the steering wheel 17 is not operated to return to a straight-move position after the steered wheel 16 is stopped at the left end position L or the right end position R by the stop control. These flowcharts are executed repeatedly at intervals of predetermined time (e.g., 5 to 100 msec.).

First, in step (hereinafter, simply noted as S) 11, the tire angle θ detected by the tire angle sensor 39 is judged whether or not it is equal to the end angle α or the end angle β. If the tire angle θ is equal to one of the end angles α, β, the routine moves on to S13. If the tire angle θ is not equal to the end angles α, β, in other words, if the steered wheel 16 has not reached the end positions L, R, the routine moves on to S12.

In S12, the PS motor 36 is controlled in accordance with the operation of the steering wheel 17.

In S13, the PS motor 36 is stopped. The steered wheel 16 is thereby stopped at the left end position L or the right end position R. Because of road resistance that is relatively strong, the steered wheel 16 stops substantially without coasting at the same time as the PS motor 36 is stopped. When the coast of the steered wheel 16 is required to be taken into account, the PS motor 36 may be stopped slightly before the end angles α, β to ensure that the steered wheel 16 stops at the end positions L, R.

In S14, a flag value is set at 1. When the tire angle θ of the steered wheel 16 reaches the end angles α, β to stop the steered wheel 16 at the end positions L, R, the flag becomes 1. The CPU 22 executes the hold control routine shown in FIG. 2 when the flag is 1.

In S21, it is judged whether the steering wheel operation that changes the tire angle θ toward the straight-move position has been made. If the outcome of S21 is positive, the routine moves on to S26. If the outcome of S21 is negative, that is, when the steering wheel 17 is not operated or the steering wheel 17 is operated toward one of ends, the routine moves on to S22.

In S22, it is judged whether the tire angle θ is equal to the end angles α, β. When the tire angle θ is equal to the end angles α, β, the current routine is finished. When the tire angle θ is not equal to the end angles α, β the routine moves on to S23. For example, if the steered wheel 16 steps on stones or the like on a road while the forklift 1 is running, an external force is applied to the steered wheel 16. As a consequence, the steered wheel 16 deviates from the end positions L, R even though the steering wheel 17 is not operated. In this case, the tire angle θ does not correspond to the end angles α, β. In addition, although it is rare, the steered wheel 16 can coast beyond the end positions L, R during the stop control, which causes the tire angle θ not to correspond to the end angles α, β.

In S23, it is judged whether the steered wheel 16 has deviated toward the straight-move position from the end positions L, R. When the steered wheel 16 has deviated toward the straight-move position, the routine moves on to S24. When the steered wheel 16 has gone beyond the end positions L, R in the end direction, the routine moves on to S25.

In S24, the PS motor 36 is driven to turn the steered wheel 16 in a direction to return to the end positions L, R (opposite side to the straight-move side).

In S25, the PS motor 36 is driven to turn the steered wheel 16 toward the straight-move position.

Figure 2:
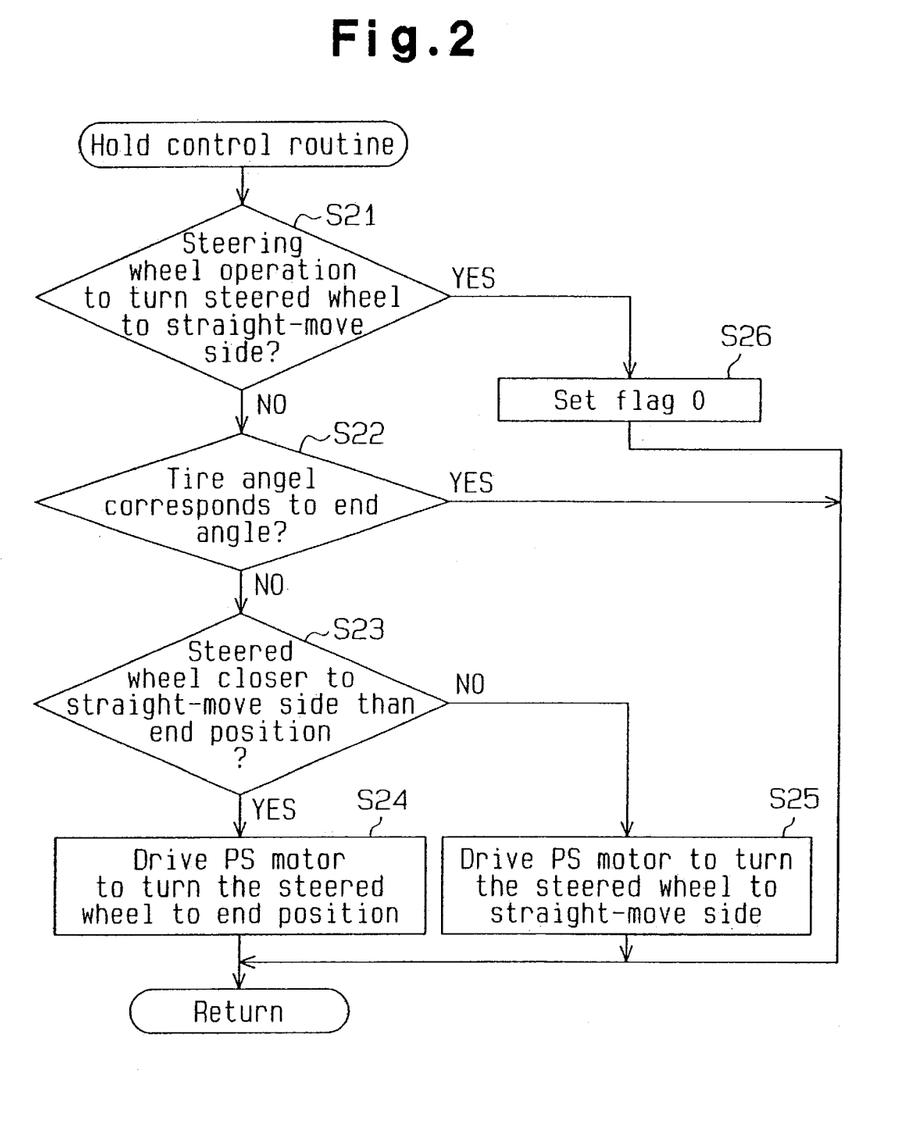
FIG. 2 is a flowchart of a hold control for holding the steered wheel at an end position.

In step 26, the flag value is set at 0 to exit the routine in FIG. 2. This means that if the steering wheel 17 is operated toward the straight-move position after the steered wheel 16 is stopped at the end positions L, R by the stop control, the hold control is canceled.

As described above, the end position stop control routine and the hold control routine (only when the flag is 1) are executed repeatedly every predetermined interval, and thereby the stop control and hold control of the PS motor 36 are performed. In the controller 21, part that performs the processing of the end position stop control routine (S11 to S14) performs the stop control, and part that performs the processing of the hold control routine (S21 to S25) performs the hold control.

Next, the operation of the stop control and the hold control that have been mentioned above will be described in accordance with FIGS. 4(a) and 4(b).

Figure 4B:
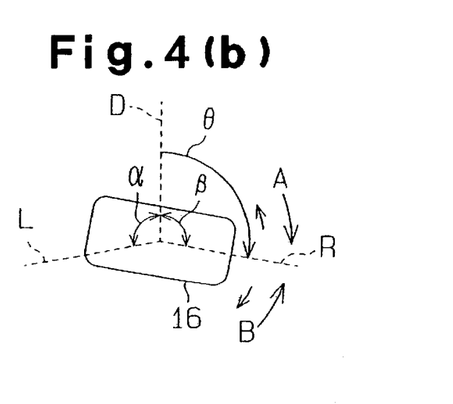
FIG. 4(b) is a schematic plan view of the steered wheel in the right end position.

For example, if the steering wheel 17 is steered largely in the left direction when the steered wheel 16 is in the state of moving straight as shown in FIG. 4(a), the steered wheel 16 turns to right from the state of FIG. 4(a) to that of FIG. 4(b). As shown in FIG. 4(b), if the tire angle θ reaches the end angle β, the PS motor 36 is stopped to stop the steered wheel 16 at the right end position R.

After the steered wheel 16 stops at the right end position R in such a way, the external force might cause the steered wheel 16 to deviate to the straight move side. In this case, the steered wheel 16 turns (turns to right) to the right end position R (in a direction of arrow A in FIG. 4(b)) to return to the right end position R. If the steered wheel 16 turns beyond the right end position R, the steered wheel 16 turns (turns to left) to the straight-move side (in a direction of arrow B in FIG. 4(b)) and returns to the right end position R. Further, in the hold control, if the steered wheel 16 coasts beyond the right end position R over to the end direction side or to the straight-move side, the PS motor 36 is driven to return the steered wheel 16 to the right end position R. In this way, the steered wheel 16 is stopped at the right end position R, and then held at the right end position R by the hold control. In this state of hold control, if the steering wheel 17 is operated (steered to right) to turn the steered wheel 16 toward the straight-move position, the hold control is canceled. The steered wheel 16 is again steered according to the operation of the steering wheel 17. In the above description, the stop control and the hold control are applied to the case of the right end position R. It should be understood that the stop control and the hold control are applied in the same way to the case of the left end position L.

The present embodiment provides the following advantages.

(1) The steered wheel 16 is turned to the left or turned to the right until the tire angle $\theta$ reaches the end angles $\alpha$, $\beta$. Accordingly, the driving of the PS motor 36 is stopped to stop the steered wheel 16 at the end positions L, R. Further, if the steered wheel 16, which once stopped at the end positions L, R, deviates from the end positions L, R because of the external force or coasting while the steering wheel 17 is not operated, the PS motor 36 is driven to control the steered wheel 16 such that it returns to the end positions L, R. This prevents the stopper from contacting and can make the steered wheel 16 held at the end positions L, R.

(2) When the steered wheel 16 stops at the left end position L or the right end position R, the stopper of the supporting member 38a never collides with the stopper blocks 53a and 53b, which are on the side of the vehicle. Therefore, when the steered wheel 16 stops at the end positions, the gear 37 and the gear wheel 38 are less likely to receive load. This eliminates the necessity for a process for strengthening the gear 37 and the gear wheel 38. Further, unpleasant noise caused by the impact of the stopper is prevented.

(3) The stop control and the hold control are performed by the controller 21, which controls the PS motor 36 electrically. Therefore, a relatively simple modification of design to change the control program stored in the ROM 23 allows the stop control and the hold control to be added.

(4) The values of the end angles $\alpha$, $\beta$ are the numerical data in the ROM 23 and can readily be changed according to necessity.

(5) The tire angle sensor 39 detects the location of the steered wheel 16 at the end positions L, R and also detects the deviation of the steered wheel 16 from the end positions L, R. Thus, only one sensor is sufficient to detect these.

(6) The tire angle sensor 39, which is originally comprised in the full-electric steering apparatus, is utilized for the stop control and the hold control. This does not require new sensors to be provided.

(7) Because deceleration areas are not set near the ends, the steered wheel 16 turns without decelerating from the value that corresponds to the operation of the steering wheel 17 until it reaches the end positions L, R. This improves the responsiveness of the steered wheel 16.

It should be apparent to those skilled in the art that the present invention may be embodied in many other specific forms without departing from the spirit or scope of the invention. Particularly, it should be understood that the invention may be embodied in the following forms.

The turning speed of the steered wheel may be decelerated when the steered wheel approaches the left end position L or the right end position R. In this case, the steered wheel 16 is less probable to coast beyond the end positions L, R.

In the hold control, the PS motor 36 may be decelerated from the value that corresponds to the operation of the steering wheel to turn the steered wheel 16.

Steered wheel position detection means is not limited to be constituted of the potentiometer. It may be constituted by disposing and setting switches in the end position. At least two switches may be provided on the right and left; one for end detection and the other for detecting that the steered wheel 16 has deviated from the end. By making the positions to place the switches variable, for example, by means of a sliding structure, the end positions can be changed. A plurality (three or more on one side) of switches may be provided.

The end angle $\alpha$ and the end angle $\beta$ are set to be equal in the above description. Taking the asymmetry of the steering apparatus into account, they may be different on the right and left.

The values of the end angles $\alpha$, $\beta$ may be stored in an EEPROM such as a flash memory, so that dealers and drivers can change the values according to the desire of customers.

Other actuators such as a hydraulic motor of electric control type or a hydraulic cylinder may be used as driving means.

The stopper 52 and the stopper members 53a and 53b may be omitted.

The sensors such as the potentiometer may be used as the steering angle sensor.

The sensors such as the rotary encoder and the magnetic sensor may be used as the tire angle sensor.

The steering apparatus is not limited to the full-electric type. For example, it may be a full-hydraulic type that steers the steered wheel by supplying a steering cylinder with an amount of oil that corresponds to the operation of the steering wheel.

The present invention may be applied to a type of vehicle with two steered wheels.

The present invention may be applied to other industrial vehicles such as a vehicle for high-place operation, a counterbalance type forklift or a toeing tractor. The present invention may be applied to vehicles other than the industrial vehicles.

Therefore, the present examples and embodiments are to be considered as illustrative and not restrictive and the invention is not to be limited to the details given herein, but may be modified within the scope and equivalence of the appended claims.

What is claimed is:

1. A steering apparatus for a vehicle, the steering apparatus comprising:

a manipulator;

a steered wheel being steered in a steered range, which is between two predetermined end positions;

a first detector, wherein the first detector detects operation of the manipulator and outputs a signal representing the detection result;

a driving device for generating a driving force to steer the steered wheel;

a second detector, wherein the second detector detects at least one of two states of the steered wheel and outputs a signal representing the detection result, wherein, in one of the states, the steered wheel is at either of the end positions, and wherein, in the other state, the steered wheel is deviated from either of the end positions; and a controller for controlling the driving device, wherein the controller causes the driving device to steer the steered wheel in accordance with the signal from the first detector, and wherein, when the steered wheel reaches either one of the end positions, the controller causes the driving device to stop steering motion of the steered wheel based on the signal from the second detector and to hold the steered wheel at the end position.

2. The steering apparatus according to claim 1, wherein the driving device is a motor, wherein the steering apparatus is full-electric type.

3. The steering apparatus according to claim 1, wherein the second detector is a tire angle sensor, which continuously detects the position of the steered wheel.

4. The steering apparatus according to claim 1, wherein a steering speed of the steered wheel is proportional to an operating speed of the manipulator in the steered range.

5. The steering apparatus according to claim 1, wherein, when the steered wheel is in the vicinity of and is approaching either of the end positions, the steering speed of the steered wheel is lower than the steering speed of the steered wheel in the steered range except for the end positions.

6. The steering apparatus according to claim 1, wherein the driving device is a hydraulic type actuator.

7. The steering apparatus according to claim 1, wherein, when the steered wheel is deviated from the steered range, the controller causes the driving device to move the steered wheel back to the corresponding end position.

8. An industrial vehicle having a steering apparatus, wherein the steering apparatus includes:
   a manipulator;
   a steered wheel being steered in a steered range, which is between two predetermined end positions;
   a first detector for outputting a signal detecting the operation of the manipulator;
   a driving device for generating a driving force to steer the steered wheel;
   a second detector, wherein the second detector outputs a signal detecting at least one of two states of the steered wheel, wherein, in one of the states, the steered wheel is at either of the end positions, and wherein, in the other state, the steered wheel is deviated from either of the end positions; and
   a controller for controlling the driving device, wherein the controller makes the driving device steer the steered wheel in accordance with the signal from the first detector, and wherein the controller further controls the driving device to stop steering motion of the steered wheel when the steered wheel reaches the end position based on the signal from the second detector and to hold the steered wheel at the end position.

9. The industrial vehicle according to claim 8, wherein the vehicle is a forklift.

10. The industrial vehicle according to claim 8, wherein the driving device is a motor, wherein the steering apparatus is full-electric type.

11. The steering apparatus according to claim 8, wherein the second detector is a tire angle sensor, which continuously detects the position of the steered wheel.

12. The industrial vehicle according to claim 8, wherein a steering speed of the steered wheel is proportional to an operating speed of the manipulator in the steered range.

13. A steering apparatus for a vehicle, the steering apparatus comprising:
   a manipulator;
   a steered wheel being steered in a steered range, which is between two predetermined end positions;
   a first detector, wherein the first detector detects operation of the manipulator and outputs a signal representing the detection result;
   a driving device for generating a driving force to steer the steered wheel;
   a second detector, wherein the second detector detects at least one of two states of the steered wheel and outputs a signal representing the detection result, wherein, in one of the states, the steered wheel is at either of the end positions, and wherein, in the other state, the steered wheel is deviated from either of the end positions; and
   a controller for controlling the driving device, wherein the controller causes the driving device to steer the steered wheel in accordance with the signal from the first detector, and wherein, when the steered wheel reaches either one of the end positions, the controller causes the driving device to stop steering motion of the steered wheel, and wherein, when the steered wheel is deviated from the steered range, the controller causes the driving device to move the steered wheel back to the corresponding end position.

14. The steering apparatus according to claim 13, wherein the driving device is a motor, wherein the steering apparatus is full-electric type.

15. The steering apparatus according to claim 13, wherein the second detector is a tire angle sensor, which continuously detects the position of the steered wheel.

16. The steering apparatus according to claim 13, wherein a steering speed of the steered wheel is proportional to an operating speed of the manipulator in the steered range.

17. The steering apparatus according to claim 13, wherein the driving device is a hydraulic type actuator.

* * * * *

UNITED STATES PATENT AND TRADEMARK OFFICE
CERTIFICATE OF CORRECTION

PATENT NO. : 6,697,722 B2
DATED : February 24, 2004
INVENTOR(S) : Hiroyuki Fujimori

It is certified that error appears in the above-identified patent and that said Letters Patent is hereby corrected as shown below:

<u>Title page,</u>
Item [56], References Cited, FOREIGN PATENT DOCUMENTS, please add:
-- JP   2001-88729   4/01 --

<u>Column 6,</u>
Line 9, please delete "β" and insert therefore -- β, --

Signed and Sealed this

Third Day of August, 2004

JON W. DUDAS
*Acting Director of the United States Patent and Trademark Office*